Dec. 5, 1950  R. D. BEATTY, JR  2,532,882
HEATING AND VENTILATING APPARATUS
Filed Aug. 28, 1946  2 Sheets-Sheet 1

INVENTOR.
ROBERT D. BEATTY Jr
BY
McDonald & Teagno
ATTORNEYS

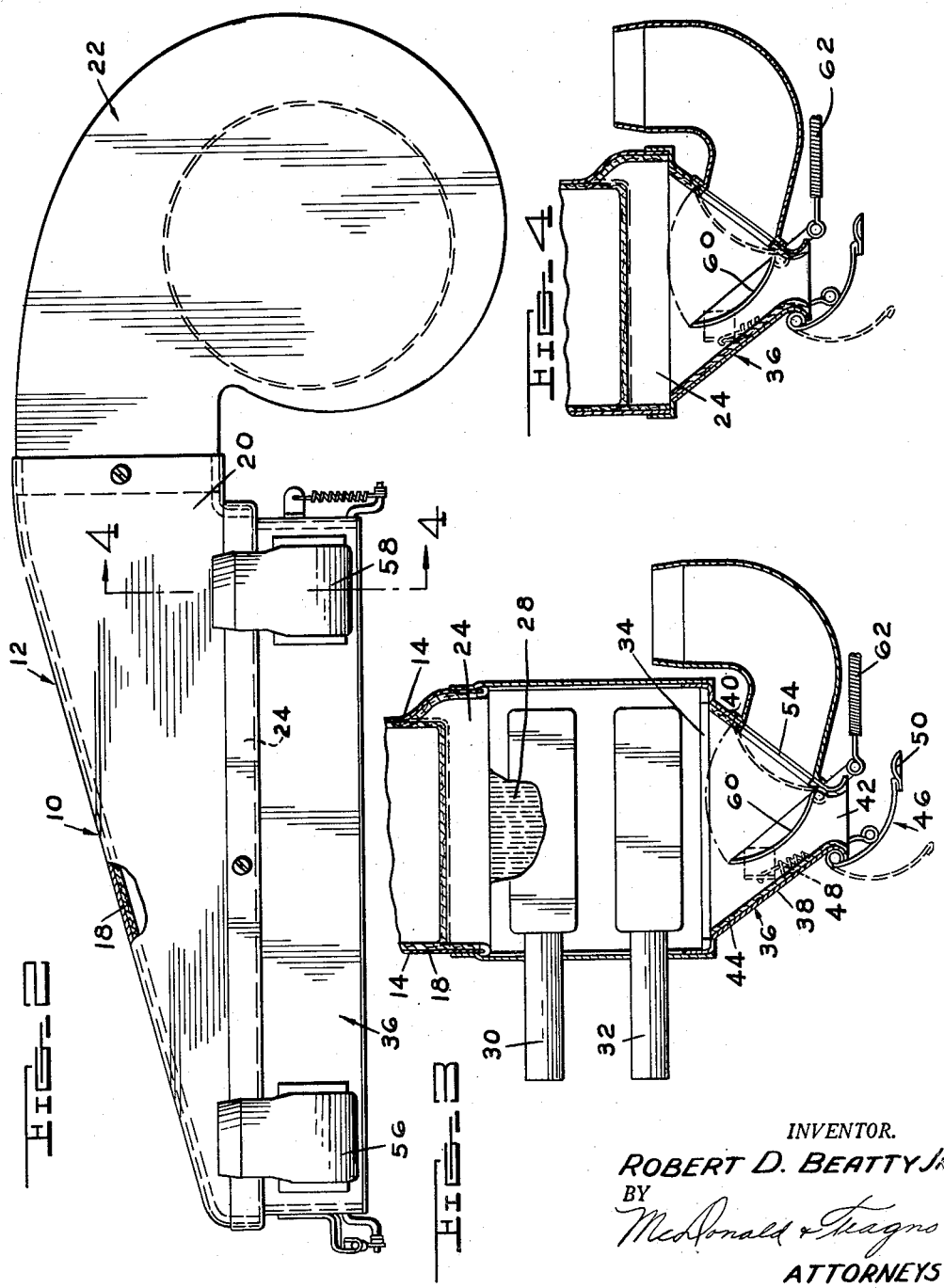

Patented Dec. 5, 1950

2,532,882

UNITED STATES PATENT OFFICE 2,532,882

HEATING AND VENTILATING APPARATUS

Robert D. Beatty, Jr., Shaker Heights, Ohio, assignor to Eaton Manufacturing Company, Cleveland, Ohio, a corporation of Ohio Application August 28, 1946, Serial No. 693,454

6 Claims. (Cl. 98—2)

This invention relates to heating and ventilating apparatus for motor vehicles and more particularly to air distributor means therefor.

Broadly the invention comprehends the provision of an air distributor adapted to be associated with combination heating and ventilating apparatus for motor vehicles for effectively and uniformly distributing air delivered thereto into the passenger compartment of the motor vehicle.

An object of the invention is the provision of an air distributor means for heating and ventilating apparatus of simple and economical construction effective to evenly and silently distribute air delivered thereto into the passenger compartment of a motor vehicle within which it is adapted to be located.

Another object of the invention is the provision of air distributor means for ventilating and heating apparatus for smoothly, uniformly, and quietly distributing a high volume of air delivered thereto from the air impeller means of the ventilating and heating apparatus.

A further object of the invention is the provision of an air distributor means for ventilating and heating apparatus for evenly and effectively distributing air delivered thereto over a wide area.

A yet further object of the invention is the provision of air distributor means for distributing air delivered thereto from an air impeller or blower of a heating and ventilating apparatus of motor vehicles having means incorporated therein effective to minimize the sound of air delivered thereto, and distributed thereby.

A still further object of the invention is the provision of a heating and ventilating apparatus for motor vehicles comprising a blower, a heating core, and an air distributing housing associated with the blower and core effective to distribute the air delivered by the blower over a wide area with a minimum of air noise.

Other objects and advantages of the invention will appear from the following description taken in connection with the drawings, forming a part of the specification, and in which:

Figure 2 is a front plan partially sectionalized view of a modified form of air distributing means for heating and ventilating apparatus of a motor vehicle.

Figure 3 is a fragmentary sectionalized view taken along substantially the lines 3—3 of Figure 1, and Figure 4 is a fragmentary sectionalized view taken along the lines of 4—4 of Figure 2.

Figure 1:
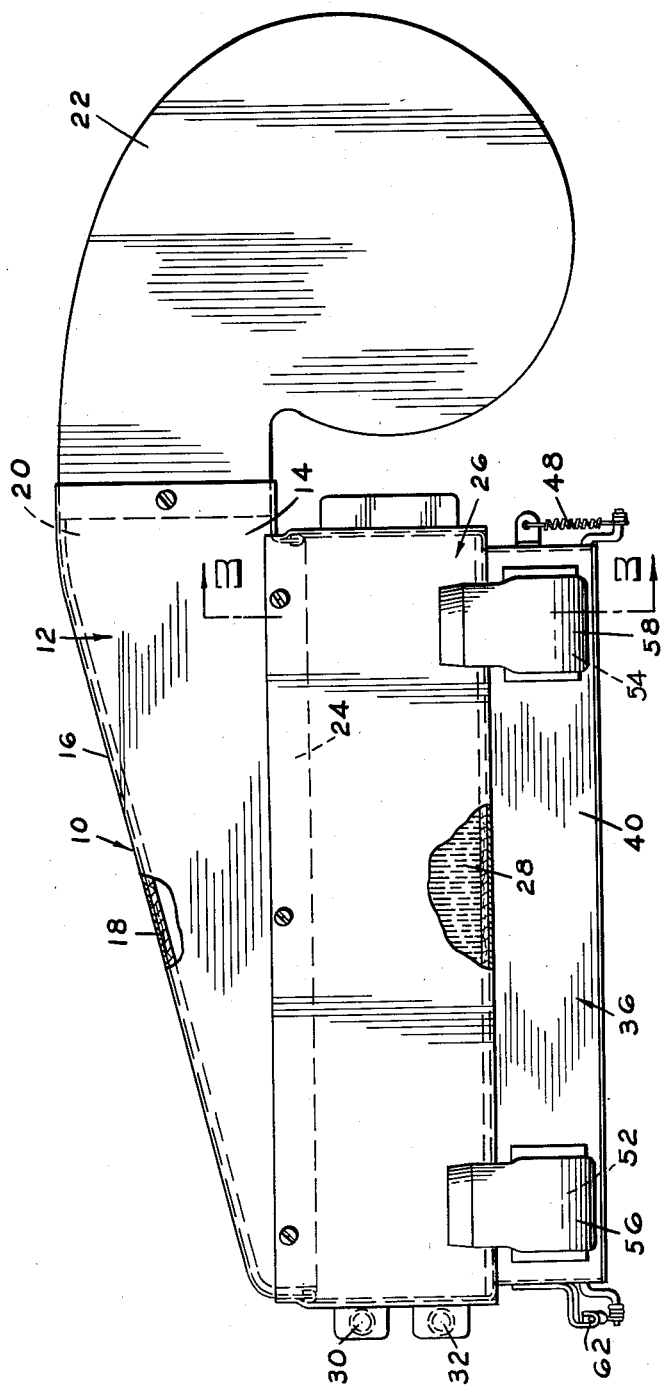
Figure 1 is a front plan partially sectionalized view of an air distributor for a heating and ventilating apparatus having a heating core and air impeller housing associated in combination therewith.

It has become necessary to provide in association with presently developed high air capacity output heating and ventilating apparatus for motor vehicles air distributing and silencing means for delivering air to the passenger compartment in a silent effective manner. The present invention comprehends an air distributing means in the form of housing of novel construction having sound absorbing characteristics and air directing means for uniformly and silently distributing air delivered thereto by air impelling means associated therewith forming part of a complete heating and ventilating apparatus.

Referring to the drawings for more specific details of the invention wherein like numerals refer to like parts throughout the drawings and with reference to Figure 1 thereof, 10 represents generally an air distributor means adapted to form part of a complete heating and ventilating apparatus and adapted to be mounted in a suitable place in the passenger compartment of the automotive vehicle for the deliverance of air to the passenger compartment thereof.

The air distributor 10 comprises a main body portion or housing 12 having side walls 14 and an angularly disposed top wall 16; said walls and top being internally covered by a sound absorbent sheathing 18. An open end 20 of the housing is suitably secured to an air impeller housing 22, said housing 22 being adapted to receive therein an air impeller or blower, not shown, for the purpose of providing means for delivering air directly to the air distributing housing 12.

The housing 12 is also provided with a base opening 24 communicating with and having secured thereupon a heater core housing 26 in which is disposed a heater core 28, said core having suitable inlet and outlet connections 30 and 32 respectively for association with a heated liquid supply such as the conventional cooling water system of an internal combustion engine of a motor vehicle. The core housing 28 has mounted in an opening 34 thereof oppositely disposed from the opening 24 of the housing 12 communicating therewith an outlet conduit 36 of venturi or tapered cross sectional outline providing angularly disposed walls 38 and 40 and having an opening 42 across the full face thereof serving as the outlet for air delivered to the air distributor housing 12 from the air impeller or blower adapted to be mounted in the housing 22.

The conduit 36 similarly to the housing 12 has a sound absorbent sheathing 44 covering the internal faces of the walls 38 and 40.

A gate 46 hinged upon the wall 38 adapted to direct the outflow of air from opening 42 is tensioned by spring 48 and includes a finger tip handle 50 permitting of the manual setting of the gate to the position desired of the full or dotted line positions as shown by Fig. 3 providing for directed flow of air. The wall 40 has a pair of apertures 52 and 54 associated with air defroster tubes 56 and 58 respectively controlled by a gate 60 mounted on the wall 40 operable by a rod or cable 62 adapted to be manually manipulated from a point remote from the distributor.

Figure 2 is a modified form of air distributor of similar design as that shown by Figure 1 with the omission of the heater core and heater core housing such that the outlet conduit 34 is directly mounted upon the housing 12 thus providing that the air delivered to the housing 12 is directly distributed therefrom through the conduit 36 to the passenger compartment. In a structure of this sort with the distributor associated with a heating system as well as providing use as a ventilating system for the distribution of air the heater core therefor may be arranged at a point in the heating apparatus forward of the air impelling housing so as to permit of the function of the air distributor, as shown by Figure 2, in a like purpose and capacity as the structure shown by Figure 1.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An air distributor and silencing means for heating and ventilating apparatus of motor vehicles comprising a housing having an air intake connection at one end thereof, a wall angularly disposed in facing relation to the air intake end, and a pair of parallel side walls secured to the angular wall forming a discharge opening facing the angular wall, an outlet duct mounted upon the housing in open communication with the discharge opening having an equi conical cross sectional passage communicating with the discharge opening and tapering away therefrom to an elongated aperture extending lengthwise with the walls of the housing, and defroster outlets, defroster ducts extending from the outlet duct at the defroster outlets, and a manually controlled air directing means mounted upon the outlet duct operable to close the defroster outlets in one position and to close the aperture in its other opposite position.

2. An air distributor for heating and ventilating apparatus for motor vehicles adapted to be mounted in the passenger compartment of the vehicles comprising an elongated housing having air entrance and exit passages disposed at 90 degrees to one another, a wall inclined in facing relation to said entrance and exit passages, and a pair of parallel walls each joined at one side to the inclined wall providing a channel therebetween leading from the entrance to the exit of the housing, a heater core housing having a pair of oppositely disposed openings supported upon the elongated housing in communication with the exit passage of the elongated housing, a heater core supported in the heater core housing and an elongated outlet duct supported upon the heater core housing in communication with one of the openings of the heater core housing having an aperture extending substantially throughout the length thereof and a plurality of defroster duct outlets in a wall thereof, and manually air directing means hinged upon the duct having a curved surface throughout its length for directing the air adapted to be passed through the duct effective to scoop up the air for delivery through the defroster duct outlets in one position and simultaneously restrict the flow through the aperture or to shut off the defroster duct outlets from air flow communication thereto in its other position while simultaneously permitting free air flow through the aperture, said elongated housing duct having sound absorbing material lining the interior walls thereof.

3. An air distributor for heating and ventilating apparatus for motor vehicles adapted to be mounted in the passenger compartment of the vehicles comprising an elongated housing having air entrance and exit passages disposed at 90 degrees to one another, a wall arranged in inclined facing relation with said entrance and exit passages, and a pair of parallel walls each joined at one side to the inclined wall providing a channel therebetween leading from the entrance to the exit of the housing, a heater core housing having a pair of oppositely disposed openings supported upon the elongated housing in communication with the exit passage of the elongated housing, a heater core supported in the heater core housing and an elongated outlet duct supported upon the heater core housing in one of the openings of the heater core housing having an equi conical cross sectional tapered passage, an outlet aperture communicating therewith extending substantially throughout the length thereof, and positionable air directing means controlling the aperture in the duct, said elongated housing duct having sound absorbing material lining the interior walls thereof.

4. An air distributor for heating and ventilating apparatus for motor vehicles adapted to be mounted in the passenger compartment of the vehicles comprising an elongated housing having air entrance and exit passages disposed at 90 degrees to one another, a wall extending angularly between and facing said entrance and exit passages, and a pair of parallel walls each joined at one side to the angular wall providing a channel therebetween leading from the entrance to the exit of the housing, a heater core housing having a pair of oppositely disposed openings supported upon the elongated housing in communication with the exit passage of the elongated housing, a heater core supported in the heater core housing and an elongated outlet duct supported upon the heater core housing having an inlet opening coinciding with one of the openings of the heater core housing, an outlet aperture extending substantially throughout the length thereof, and a pair of outlets in the wall thereof adapted to be connected with window defrosting conduits, air directing means for the outlet aperture of the duct, a control gate for the outlets in the wall of the duct, and means for actuating the gate from a point remote therefrom.

5. An air distributor for heating and ventilating apparatus adapted to be located in a passenger compartment of vehicles comprising a housing having a pair of parallel side walls and a connecting wall providing air entrance and exit openings disposed at right angles to one another and wherein said connecting wall is inclined in facing relation to the entrance and exit passages and extends therebetween, an outlet conduit mounted upon the housing in communication with the exit passage thereof having a symmetrically walled venturi cross-sectional shaped passage therethrough terminating in an air outlet opening and having a pair of defroster outlet openings in one wall thereof, and a gate mounted in the conduit controlling the passage of air through the air outlet openings in the conduit.

6. An air distributor comprising a housing having air entrance and discharge openings disposed at right angles to one another and a wall inclined to the openings and extending therebetween, a duct mounted on the housing at the discharge opening therefrom extending across the discharge opening in communication therewith having a tapered cross section decreasing in size from the communication with the housing and terminating in an elongated discharge opening the walls of which are symmetrically arranged to one another such that the opening thereof lies in a plane parallel to the plane in which the housing discharge opening lies and a pair of defroster outlet openings in a wall thereof and a gate pivotally mounted in the duct having a curved surface extending the length of the gate, said gate movable to control the flow of air through the discharge opening and defroster outlet openings.

ROBERT D. BEATTY, Jr.

REFERENCES CITED

The following references are of record in the file of this patent:

UNITED STATES PATENTS

| Number | Name | Date |
|---|---|---|
| 1,511,920 | Tregillus | Oct. 14, 1924 |
| 1,811,767 | Turner | June 23, 1931 |
| 1,909,144 | Bates | May 16, 1933 |
| 1,964,845 | Dietze et al. | July 3, 1934 |
| 1,968,560 | Kulicke | July 31, 1934 |
| 2,184,095 | Daly et al. | Dec. 19, 1939 |
| 2,223,709 | Wickstrom et al. | Dec. 3, 1940 |
| 2,293,543 | Hans | Aug. 18, 1942 |
| 2,304,643 | Hans | Dec. 8, 1942 |